United States Patent [19]

Bruno

[11] Patent Number: 4,541,618

[45] Date of Patent: Sep. 17, 1985

[54] JIG FOR FRAMED WOODEN PANELS

[76] Inventor: Michael R. Bruno, 19, Romilly Park Rd., Barry, Glamorgan, England

[21] Appl. No.: 452,730

[22] Filed: Dec. 23, 1982

[30] Foreign Application Priority Data

Dec. 23, 1981 [GB] United Kingdom ............... 8138767
Oct. 16, 1982 [GB] United Kingdom ............... 8229226

[51] Int. Cl.$^4$ ............................................. B25B 5/00
[52] U.S. Cl. ........................................ 269/41; 269/43; 269/303; 269/910
[58] Field of Search ............... 269/40, 43, 303, 910; 100/913; 29/281.1, 281.3; 227/152, 154, 155

[56] References Cited

U.S. PATENT DOCUMENTS

| | | | |
|---|---|---|---|
| 2,811,186 | 10/1957 | Honza | 269/910 |
| 3,100,301 | 8/1963 | Black | 100/913 |
| 3,241,585 | 3/1966 | Jureit | 269/910 |
| 3,667,379 | 6/1972 | Templin | 269/910 |
| 3,752,467 | 8/1973 | Stanley | 269/910 |

*Primary Examiner*—Robert C. Watson
*Attorney, Agent, or Firm*—Young & Thompson

[57] ABSTRACT

A jig for manufacturing wooden fencing or shed panels is adaptable to a range of sizes. A horizontal rectangular main frame (4) provides location for all the peripheral battens of a maximum size panel and for some of the peripheral battens of lesser panels. Spanning the frame is an array of parallel beams (12) which can be adjusted transversely to their longitudinal direction. These beams carry locating elements (14) which can be adjusted longitudinally of their respective beams. Intermediate panel battens, and peripheral ones for reduced size panels, can be laid along the beams or transversely to them, in each case being held laterally by the locating elements, and at a height compatible with that of any batten resting on the main frame. Corner and T-junctions of battens can be made at any locating element, with access for nailing them together, and the main frame also provides nailing access for such junctions.

8 Claims, 7 Drawing Figures

H  V

1

1

2

2

3

3

4

4

JIG FOR FRAMED WOODEN PANELS

This invention relates to a jig for fencing or other wooden panels, such as for sheds or temporary buildings, where a rectangular wooden frame, usually with intermediate cross members, is completed by slats running either horizontally or vertically. These are usually nailed to the frame in overlapping fashion, or they may be interwoven. Reference will hereafter just be made to fencing panels, and the wooden fence members will be referred to as battens.

Fencing panels are manufactured in large quantities in a range of standard sizes. A typical range in the United Kingdom has a standard length of 6 ft. and varies by height, the minimum being 1 ft., the maximum 6 ft. with intermediate heights of 2, 3, 4 and 5 feet. A jig for a particular size can readily be made, but it lacks versatility. The major problem is that most fences are not exact multiples of 6 ft., and so there usually has to be a made-to-measure infill panel. The time taken to manufacture this is considerable, and it might take as long as, say, six ordinary panels.

The aim of this invention is therefore to provide a jig which is rapidly adaptable to any size of wooden frame up to a maximum, and which as well as adapting to different outer dimensions, can also evenly space the intermediate battens of the frame, whatever its outer dimensions.

According to the present invention there is provided a jig for manufacturing framed wooden panels comprising a rectangular frame spanned by an array of parallel intermediate members adjustable transversely to their longitudinal direction, and elements carried by said members for locating panel battens extending in either orthogonal direction, said elements being adjustable longitudinally of said intermediate members.

The frame may provide locating means for peripheral panel battens, and on each side these may comprise the upper surface of a main beam of the frame on which a batten can rest, and an outer upstanding flange or abutment against which the outside of the batten can locate. This flange or abutment will be low in relation to the depth of the peripheral battens to allow nailing horizontally through such battens into transverse ones.

Preferably, the intermediate members are beams having a sliding but clampable engagement at their ends with two opposed frame sides. Alternatively, they may be beams having step-by-step adjustable engagement with two opposed frame sides.

Conveniently, the adjustable batten locating elements have a sliding but clampable engagement with the intermediate members. Preferably, they will each have an upper surface level with the upper surfaces of the main beams and upstanding lugs for lateral location of panel battens. There need only be three lugs, with one of them serving for location in both batten directions. There may also be provided an abutment fittable to any selected element to locate the end of a batten terminating at that element, extending in either orthogonal direction, and not there abutting with its end any transverse batten. This would be used for corners of reduced size panels. Another form of abutment may be fittable to any selected locating element adjacent the main frame to locate a batten against the outer flange or abutment.

For a better understanding of the invention, one embodiment will now be described, by way of example, with reference to the accompanying drawings, in which.

Figure 2:
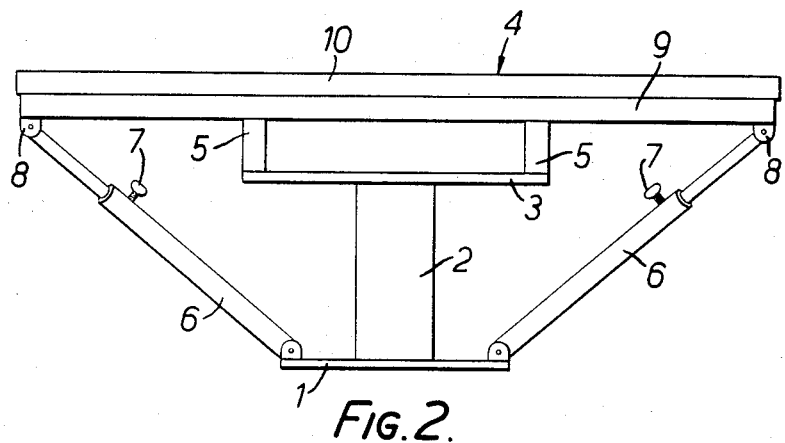
FIG. 2 is a side elevation of a jig for making such panels.
Figure 3:
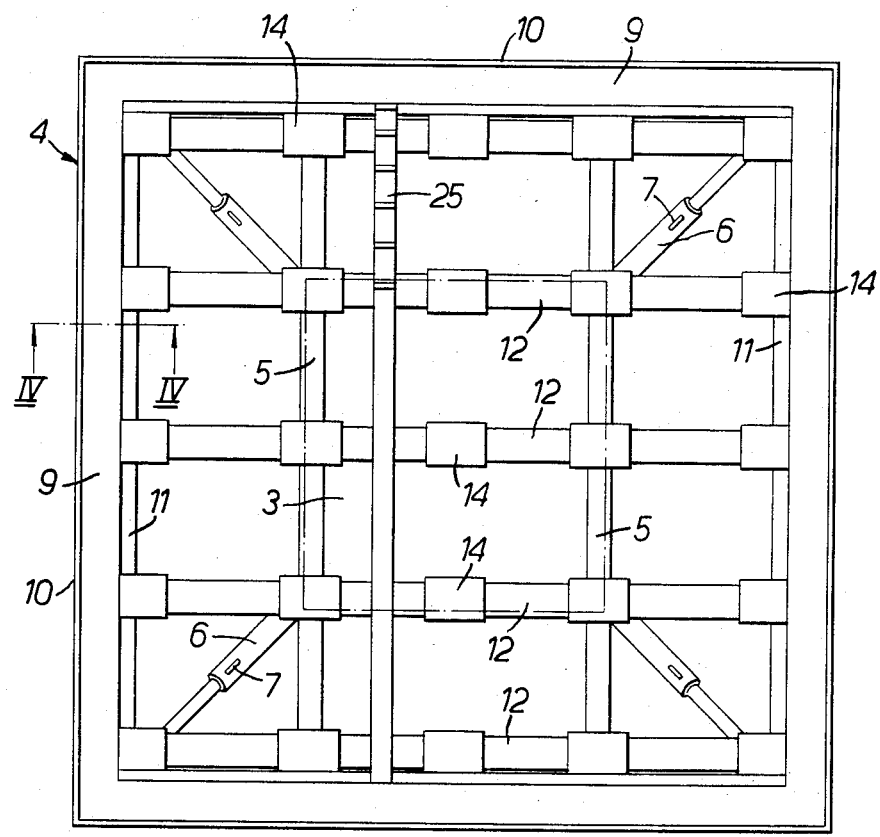
Figure 4:
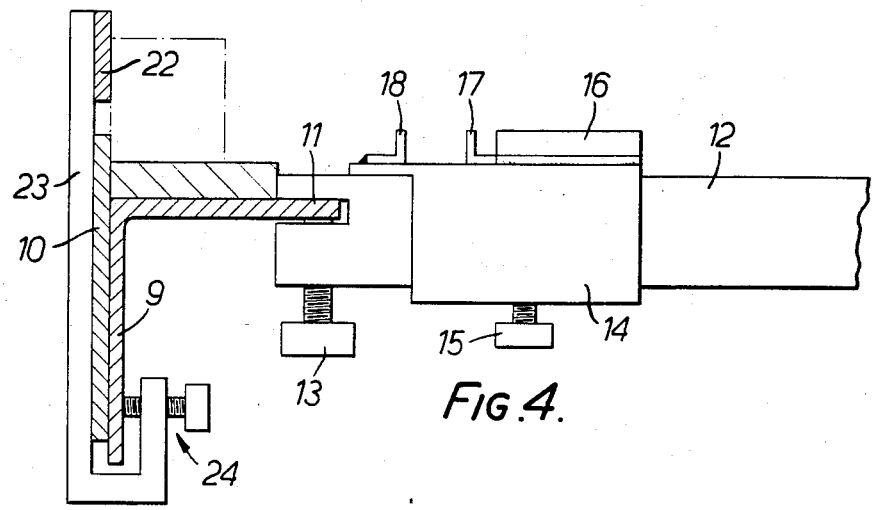
Figure 5:
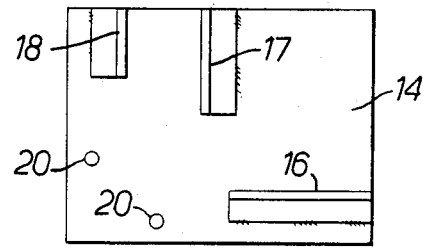
Figure 6:
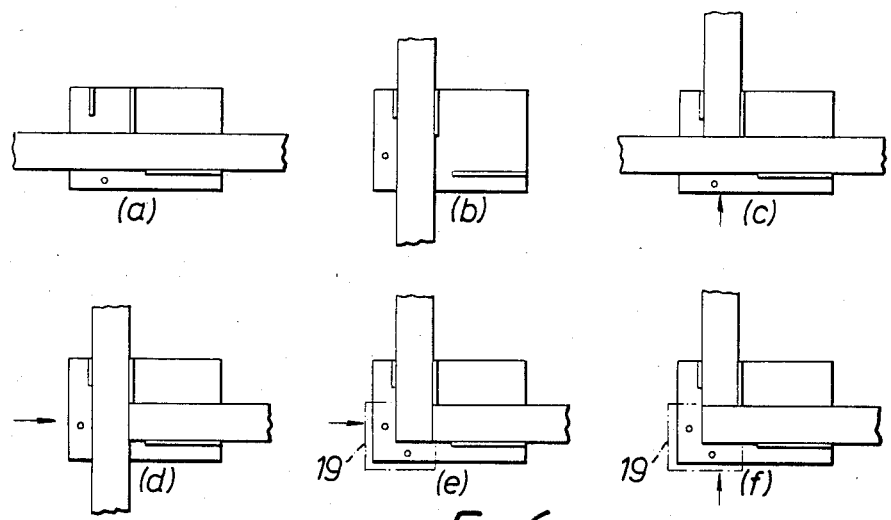

FIG. 3. is a plan view of the jig of FIG. 2,

FIG. 4 is a section, to an enlarged scale, on the line IV—IV of FIG. 3,

FIG. 5 is a plan view of a batten locating element,

FIG. 6 shows an element of FIG. 5 with various batten arrangements, and

Figure 7:
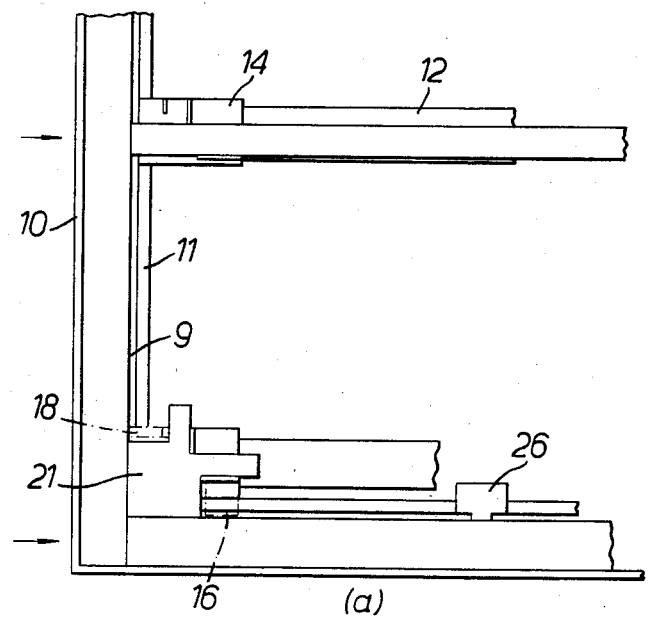
Figure 7:
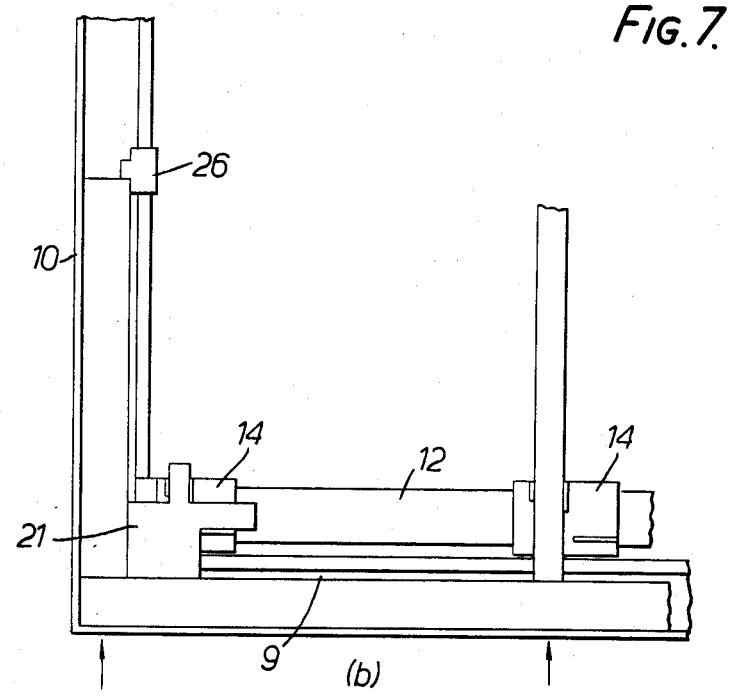

FIG. 7 shows plan views of a corner of the jig.

Figure 1:
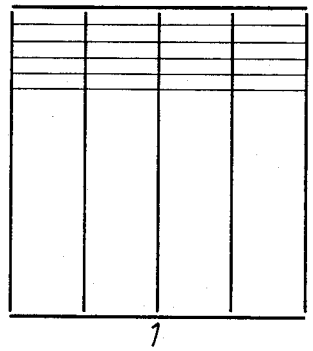
FIG. 1 shows diagrammatically various forms of fencing panel.
Figure 1:
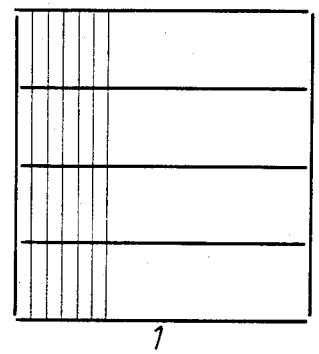
Figure 1:
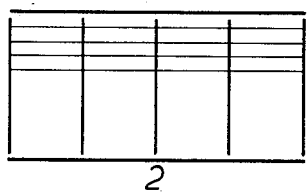
Figure 1:
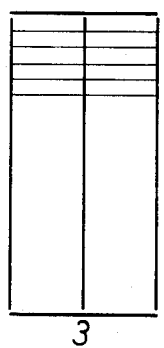
Figure 1:
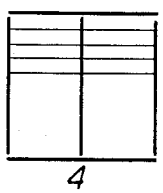

FIG. 1 illustrates various types of fencing panel, on the left there being four examples of panels H1–H4 with horizontal slats, and on the right four panels V1–V4 with vertical slats. Each panel has an outer frame and, depending on its size, one or more intermediate transverse battens, vertical for horizontal slats and horizontal for vertical slats. It is desirable for weather-proofing to have the top batten of the frame extending over all the vertical battens, and this does give a slight difference between the respective pairs of panels H1 and V1, H2 and V3, H3 and V2, and H4 and V4. If this minor variation could be ignored, then the V panels would simply be turned on one side to achieve the H panels, and only four types of panel would be necessary.

It will be assumed that the panels H1 and V1 are full sized or the largest of an available range. However, it is not always desired to have full height, and so panels H2 and V2 must be available. These may come in a range of heights and the proportions shown are one example only. Also, when constructing a fence there is almost invariably a gap to be filled at the end which is not of standard panel length and which requires a shorter, "one-off" panel. Hence, panels H3 and V3 are required for full height fencing, and panels H4 and V4 for reduced height fencing. Again, the proportions shown are illustrative only; infinite variation in width should be possible.

FIGS. 2 and 3 show the general arrangement of a jig for constructing any of these eight panels. The jig has a base plate 1 securely anchored to the ground, and a central supporting column 2 extending up from the plate to be capped by a further plate 3. A jig frame 4 is bolted to the corners of this plate 3 by means of two transverse members 5 which symmetrically span the frame, underneath it. The bolts are at the corners of a square, so that they can be undone and removed, and the frame turned through 90° and re-secured to the plate 3. Alternatively, the plate 3 may be rotatable and lockable in selected angular positions on the column 2. The purpose of this will be described later. Its height may also be adjustable.

The frame 4 projects a considerable distance all round the central column 2 and to support and hold it rigid there are provided angled struts 6. These are pivoted to the corners of the base plate 1 and are telescopic, being fixable at a set length by wing nuts 7. Their upper ends are normally bolted to lugs 8 at the corners of the frame 4. They are made adjustable in this way so that the frame can be replaced by others of different dimensions, if required. The overhang makes it easy to work by, without interference by vertical legs.

The frame 4 is square and of a size to accommodate the largest panel of a range such as panels H1 and V1. Each side consists of a main beam 9 with an external upstanding flange 10, as best seen in FIG. 4. This also shows in broken lines the section of a typical outer panel batten, and it will be noted that the height of the flange 10 is of the order of about a quarter of the thickness of the batten. This is sufficient to locate the frame member, and allows nails to be driven horizontally through it.

Each beam 9 is of inverted L-section with a flat bar welded on the horizontal leg, which extends further inwardly than the bar to provide a support ledge 11 for the ends of transverse intermediate parallel boxsection beams 12. There are five in this example and their ends are bifurcated to embrace the ledges 11, to which they can be clamped by screws 13. This allows infinite adjustment along the ledged beams 9. However, this may not be necessary, and instead, the ledge 11 might be apertured or have slots, serrations or teeth, and the ends of the beams 12 could have pins or other projections which would drop into selected apertures or engage selected slots or teeth. There would be step-by-step adjustment of the beams 12.

There are on each beam 12 five-box section sliding sleeves 14 whose upper surfaces are all level with the top of the beams 9. The sleeves 14 each have a clamp screw 15 underneath which can be turned to hold the respective sleeve in its selected position along its beam. The members 5 are U-shaped or have spacers at their ends, where they are secured to an opposite pair of side beams 9 of the frame 4, to give the sliding sleeves 14 clearance over them. The end sleeves 14 have an extended top plate which enable them to overlap the adjacent ledge 11 and abut the flat bar on top of the beam 9.

Each sleeve has panel frame locating lugs on its upper side. These are shown in FIG. 5. One lug 16 extends over about half the length of the sleeve, along one side. Another lug 17 extends from the opposite side at right angles to the lug 16, to about half way across the sleeve, but if projected it would just clear the lug 16. The third lug 18 is a short one parallel to the lug 17, on the same side of the sleeve and at the opposite end from the lug 16. The spacing between the lugs 17 and 18 corresponds to a standard panel batten, and the spacing between the inner end of the lug 17 and the imaginary continuation of the lug 16 is also that dimension.

Instead of box-section sleeves 14, there could be inverted channel members each with a clamp screw on one side flange, or a channel member with inturned flanges overlapping the beam, provided by welded-on L-sections for example. The beams themselves can be of different section, with sliding elements contoured to match.

As FIG. 6 shows, each lugged sleeve can locate battens extending either parallel to or transverse to the beams 12, see (a) and (b) respectively, and it can also locate two such battens meeting at a T-junction, as in (c) and (d). To enable the sleeve to locate two battens meeting at a corner, there must be some means for preventing the batten that is abutted by the end of the other from moving longitudinally. This can simply be provided by a drop-in lug or stop 19, shown in outline in FIGS. 6(e) and 6(f), for which apertures 20 are provided.

The arrangement for making a corner of a maximum size panel is shown in FIG. 7, where (a) illustrates one type of corner in relation to the movable beams, and (b) another.

In FIG. 7(a), the function of the lugs 16 and 17 on the end sleeves 14 on the three intermediate beams 12 (only one of which is shown) is to locate the ends of the intermediate battens. At the corner itself, the peripheral battens are entirely outside the lugs, resting on the beams 9. The lugs 16 and 18 may be made sufficiently wide, as indicated by broken lines, for the spacing between them and the flanges 10 to correspond to the width of a peripheral batten so that, when the end beam 12 is hard up against the parallel beam 9, the corner of the wooden frame is securely located. However, it may be preferred to have a corner locator piece 21 interposed. This can simply be a spacer block shaped as shown to locate against and between the lugs. In order to keep the peripheral batten which extends across the figure hard up against the flange 10, similar spacers may be mounted on the sliding sleeves 14 of the adjacent beam 12, or there may simply be wedges driven between each lug 16 and the batten. These spacers can be replaced by others if different sized battens are used.

The lugs are arranged in the same way on all the adjustable, sliding sleeves 14 and so the spacer 21 is shaped to be effective at the other corners which are not shown. Although it will not contact the peripheral battens right in the angle, the abutment against the batten which does require location will be very near its end. To have the spacers readily available, they may be on short chains attached to the associated sleeves.

If the corners are arranged the other way in relation to the jig, as shown in FIG. 7(b), the same spacer 21 will also be effective.

It is not possible to have infinite adjustment from left to right in a brief range just below the maximum dimension in FIG. 7(a) or 7(b). However, adjustment in the up and down sense is possible, even though the transverse peripheral batten may remain outside the locating elements on the adjacent beam 12. Over that first small range packing can be placed inside the transverse flange 10, and to support the batten as it overhangs the inside of the beam 9 there may be clip-on or plug-in supports attachable either to the fixed beam 9 or to the movable beam 12.

When the battens have been laid up in the jig in any of the desired patterns, a nail gun is applied horizontally to every corner and T-junction, the direction of nailing being indicated by arrows in FIGS. 6 and 7. Because the flanges 10 are low there is no impediment offered by them. Likewise, the lugs 16,17 and 18 are well clear of any nailing zone. With the lugs all similarly arranged as shown, each panel will be laid up with one corner always in the corner of the jig diagonally opposite that shown in FIGS. 7(a) and 7(b).

When the panel frame is nailed up, slats are laid across it transversely to the intermediate panel battens. In order to locate the slats longitudinally, there are abutments 22 which can be fastened over the flanges 10, as shown in FIG. 4. This is simply a bar with legs 23 that are formed at their lower ends with clamps 24. These secure to the vertical portion of the L-section beam 9. Various other arrangements such as sockets into which the legs can slot, or a hinge-up bar, are possible. These abutments need only be provided along the sides which meet at the corner which always locates a panel. Cut to length the slats can simply be abutted against them and then nailed to the battens.

An array of nail guns can be mounted on an overhead structure, and these may be aligned with the intermediate battens and the peripheral battens parallel to them. They will then be lowered into an operational position and moved across the panel, nailing all the slats in one continuous operation. The jig is made rotatable through 90° so that whichever way the battens are laid, the jig can be turned to line up with the nail gun path. Alternatively, guides for manually operated nail guns can be mounted across the frame, being located on bars similar to the abutments 22.

In order to space the slats correctly transversely to their longitudinal direction, there may be provided two frame-spanning elements 25 with upstanding abutments at the correct pitch, one of which is shown in FIG. 3. Here the slats will go parallel to the beams 12 and the elements 25 will rest on those beams with their ends on opposed ledges 11. The elements 25 are each a flat bar with upstanding fingers which will just be proud of the wooden panel frame.

For spacing slats in the other direction, there will be no intermediate beam support. Therefore, thicker, beam-like elements will be required.

Instead of using the locating sleeves and spacers 21 to help secure peripheral battens, it may be preferred to use G-clamp like devices 26 which can be fixed to the ledges 11 and project over the flat bar portion of the beams 9, thereby holding a batten up against the flange 10. They are illustrated in plan in FIG. 7, where in (a) the device 26 is simply abutting the side of the transverse batten, while in (b) it is moved further outwardly of the frame so that its stepped upper limb is locating the 'vertical' batten both against the flange 10 and longitudinally.

I claim:

1. A jig for manufacturing framed wooden panels comprising a rectangular frame spanned by an array of parallel intermediate members adjustable transversely to their longitudinal direction, the frame providing a continuous underneath support surface extending full length of each side of the frame for a batten laid thereon and an external barrier laterally to confine such a batten on all sides of the frame, the intermediate members providing a plurality of underneath support zones for any batten laid across them at the same level as the frame support surface and having groups of upstanding locators for panel battens extending in either orthogonal direction, and said barrier and said location allowing access to one side of a batten where that batten is abutted by another on the opposite side.

2. A jig as claimed in claim 1, wherein each group of locators comprises three lugs at a support zone, one of the lugs serving for location in both said orthogonal directions.

3. A jig as claimed in claim 1, wherein the locators are on elements adjustable longitudinally of said intermediate members, these elements also providing the support zones.

4. A jig as claimed in claim 1, wherein said intermediate members are beams having a sliding but clampable engagement with two opposed frame sides.

5. A jig as claimed in claim 1, wherein said intermediate members are beams having step by step adjustable engagement with two opposed framed sides.

6. A jig as claimed in claim 3 wherein said adjustable elements have a sliding but clampable engagement with said intermediate members.

7. A jig as claimed in claim 1 and further comprising an abutment fittable to any selected locating element to locate the end of a batten terminating at that element, extending in either orthogonal direction, and not there abutting with its end any transverse batten.

8. A jig as claimed in claim 3 and further comprising an abutment fittable to any selected locating element adjacent the main frame to locate a batten against the said barrier.

* * * * *